F. MEYER.
CUTTING MACHINE.
APPLICATION FILED JUNE 16, 1909.

1,007,721.

Patented Nov. 7, 1911.

2 SHEETS—SHEET 1.

Witnesses
Stuart Hilder.
George M. Anderson.

Inventor
Frank Meyer
By E. W. Anderson
his Attorney

F. MEYER.
CUTTING MACHINE.
APPLICATION FILED JUNE 16, 1909.
1,007,721.
Patented Nov. 7, 1911.
2 SHEETS—SHEET 2.
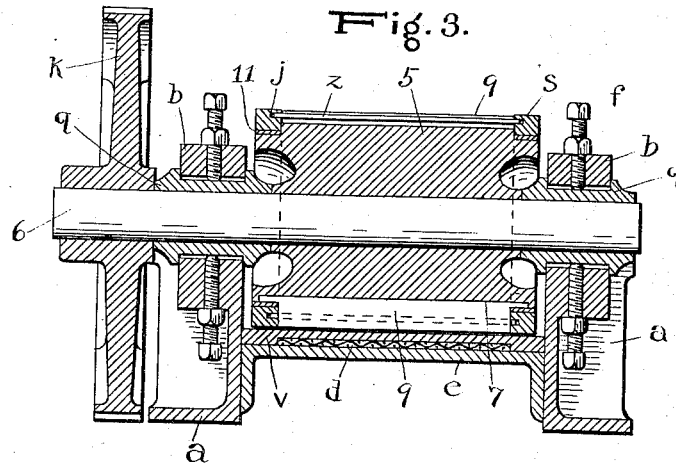
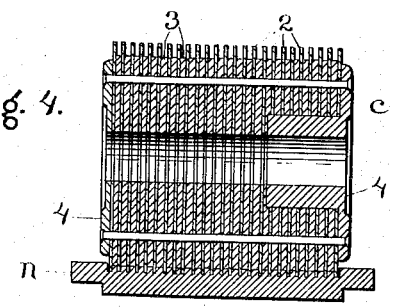
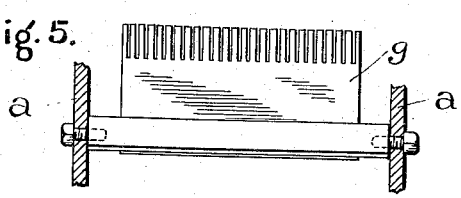
Witnesses
Stuart Hilder.
George M Anderson.
Inventor
Frank Meyer
By
E. W. Anderson
his Attorney

UNITED STATES PATENT OFFICE.

FRANK MEYER, OF NIAGARA FALLS, NEW YORK, ASSIGNOR TO THE NATURAL FOOD COMPANY, OF NIAGARA FALLS, NEW YORK, A CORPORATION OF NEW YORK.

CUTTING-MACHINE.

1,007,721.  Specification of Letters Patent.  Patented Nov. 7, 1911.

Application filed June 16, 1909. Serial No. 502,546.

*To all whom it may concern:*

Be it known that I, FRANK MEYER, a citizen of the United States, and resident of Niagara Falls, in the county of Niagara and State of New York, have made a certain new and useful Invention in Cutting-Machines; and I declare the following to be a full, clear, and exact description of the same, such as will enable others skilled in the art to which it appertains to make and use the invention, reference being had to the accompanying drawings, and to letters or figures of reference marked thereon, which form a part of this specification.

Figure 1:
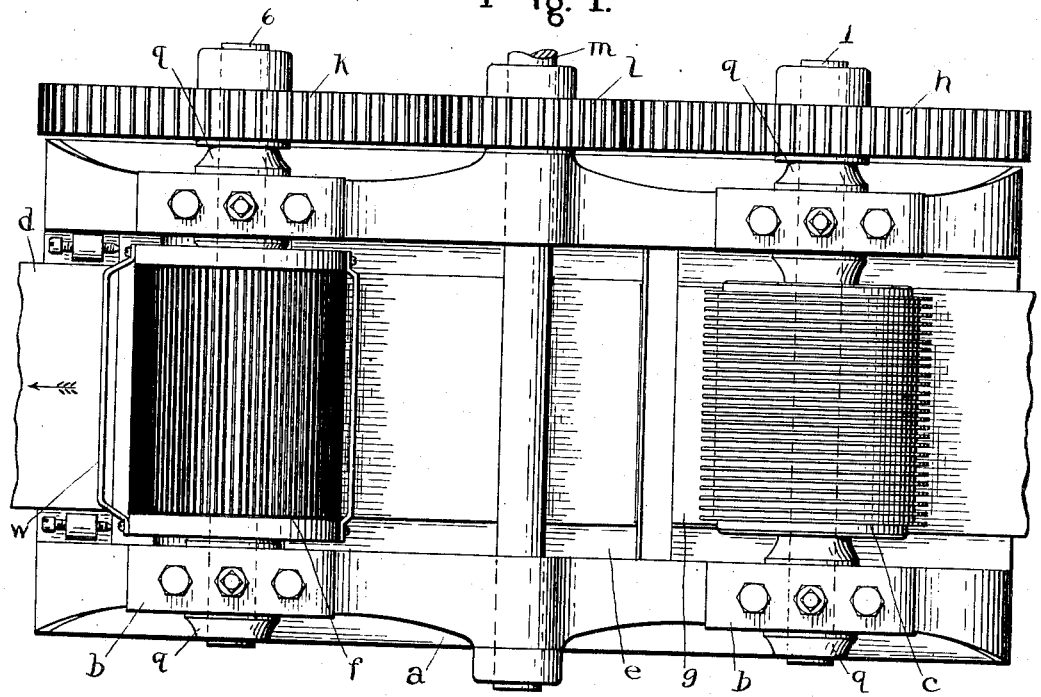
Figure 2:
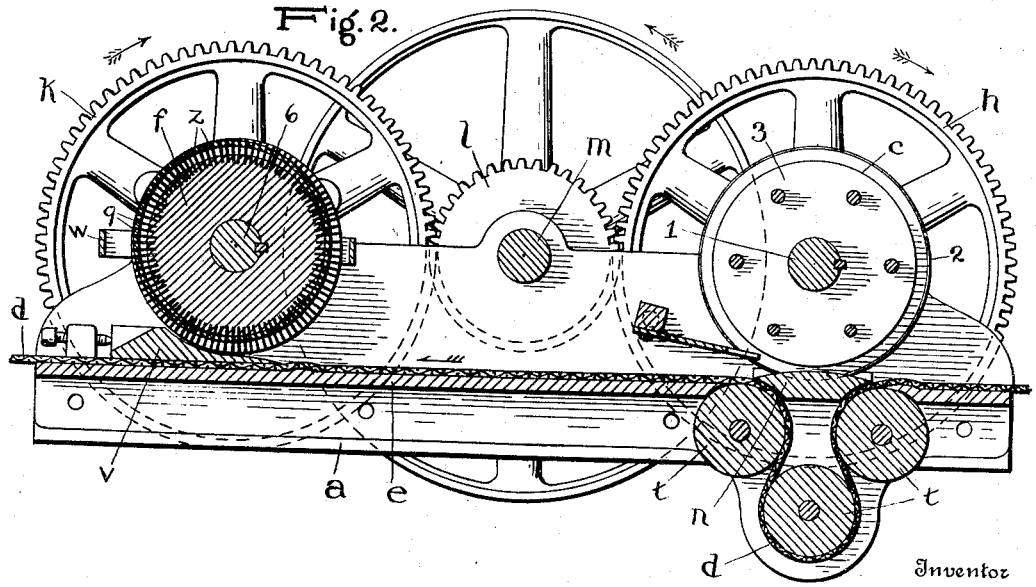

Figure 1 is a plan view, illustrating the invention. Fig. 2 is a longitudinal sectional view. Fig. 3 is a transverse section through cutting roll $f$. Fig. 4 is a transverse section through cutting roll $c$. Figs. 5 and 6 are views of details.

The invention has relation to cutting machines, adapted to subdivide material into parts of equal or nearly equal size and similar dimensions, and designed to operate with a minimum of waste; and the invention consists in the novel construction and combinations of parts, as hereinafter set forth.

In the accompanying drawings, illustrating the invention, the letter $a$, designates a frame having suitable bearings $b$, in its sides for journals or cutter rolls and gearing. The frame carries, at the feed end, a cutting roll $c$, having a series of circumferential knives designed to cut the material, which is usually submitted to the machine in sheet form, into longitudinal strips which are carried by an endless belt $d$, over the platen or bed $e$, to a second cutting roll $f$, which is adapted to cut the strips transversely in such a manner as to subdivide them into tablets or small parts of about the same dimensions.

A comb or scraper $g$, is secured to the frame, and extends across the same back of the cutting roll $c$, its fingers engaging said roll so as to discharge the strips from the channels between the knives of said roll and cause them to fall upon the belt $d$, in longitudinal position and parallel relation to each other, such relation and position being suitable for feeding them to the second cutting roll $f$, whereby they are subdivided transversely. These cutting rolls $c$, and $f$, are shown extending crosswise of the carrier, and they are provided with gear wheels $h$, and $k$, respectively, which are operated by the driving pinion $l$, of the drive shaft $m$. Micrometric adjustment is provided for these rolls by means of adjustable boxes $q$, in which the journals turn, such adjustment being designed to permit a close approach of the knives or blades to the respective cutting beds without actual contact.

Under the cutting roll $c$, is located a bridge-form cutting bed $n$, the traveling belt being depressed at this point to permit its introduction. The upper or working surface of this bed plate is crowned or made convex and shelves off to thin edge to facilitate the passage of the material to be cut. The surface of the bed plate is provided with a series of grooves to allow the passage of the disk knives 2, and to effect therewith a shearing action. In front of this cutting plate, and under the belt may be provided a transverse rise to guide the sheet of material upward and forward upon said cutting plate, and in order to deflect the carrier belt under the cutting plate, guide rolls $t$, are employed. Under the second or cross-cutting roll $f$, is also located a transverse cutting plate or bed $v$, of general wedge-like form, having a concave upper face shelving toward its front edge. This plate bridges over the carrier belt under the cutter and serves to coöperate with the cutting roll in its action and to facilitate the movement of the subdivided material in the discharge. A slight adjustment of this wedge-form cutting plate is provided for by having its holding down bolts pass through slotted holes, and adjusting screws to set it up. In front of this plate under the carrier may be located a rise to facilitate the feed to the plate. In the rear of the second or cross-wise cutter $f$, is located a transverse stop guard or fender plate $w$, which is designed to check the flying particles or pieces as they are discharged from the second cutter and cause them to fall upon the carrier belt.

The first or strip cutting roll $c$, is usually made by assembling upon a mandrel 1, a series of circular knives or cutting disks 2, usually made of saw steel, and between these cutting disks, and alternating therewith, spreader disks 3, which are of less diameter than the cutting disks and of proper thickness to insure the cut required. These disks are designed to be keyed on the mandrel, and may be provided with perforations for the reception of bolts whereby they may be clamped between hub plates 4. The second or cross-wise cutting roll f, is made by providing a body core 5, which is keyed upon a mandrel 6. This core is provided with a circumferential series of straight grooves 7, which extend radially inward from the cylinder surface of such body roll, being separated by intervals, which are made of about the same width as the spreader disks of the first or strip cutting roll c. In these grooves are located knives 9, of straight elongated form, said knives extending crosswise the direction of feed, and having at their ends shouldered projections or tangs 10, adapted to engage holding rings or bands 11, on the shouldered ends of the body core, which secure the knives in place. At the ends of this body core are annular cam guides s, which are secured to the framing, and are provided with eccentric or cam grooves j.

Between the knives 9 are located the transverse ejector bars z, such a bar being placed between each two knives. These ejector bars are long enough to have their ends extend to engage the cam grooves j, of the cam guides s, and said cam grooves are centered high in order to draw the ejector bars in during the cutting actions and push them outward intermediately, so that they are given a radial reciprocating action whereby the cutting operation is facilitated and the discharge of such tablets or pieces of material as may be held between the cutting blades is effected in a positive manner.

The operation of the machine is as follows: The material, which may be a sheet of cereal food stuff, is fed to the machine by being placed on the carrier belt, whereby it is moved to the first cutting roll, where the sheet is engaged between the disk cutters of the roll and the cutting bed plate below and is divided into strips which are discharged from between the knives by the comb fingers, and fall on the carrier whereby they are fed to the crosswise cutting roll, and are subdivided by its transverse knives and the concave bed plate into pieces or tablets which are discharged by the ejector bars upon the carrier belt, and conveyed away thereby for packing and transportation.

Having described the invention, what I claim and desire to secure by Letters Patent is:—

1. In a cutting machine, the combination with a carrier and a bridge cutting bed over said carrier of a cutting roll having a series of knives, ejector bars between said knives, and means for operating said ejector bars.

2. In a cutting machine, the combination with a cutting roll having transverse knives and reciprocating ejector bars, of a carrier, a bridge-form cutting bed, and means for operating said cutting roll and ejector bars.

3. In a cutting machine, the combination with a cutting roll having transverse knives and reciprocating ejector bars, of a carrier, a bridge cutting bed, and means for adjusting said bed.

In testimony whereof I affix my signature, in presence of two witnesses.

FRANK MEYER.

Witnesses:
JAS. TRAVERSE,
W. M. DURDAN.